(12) United States Patent
Geis et al.

(10) Patent No.: US 8,869,537 B2
(45) Date of Patent: Oct. 28, 2014

(54) APPARATUS AND METHOD OF OPERATING A GAS TURBINE ENGINE

(75) Inventors: Torsten Geis, Derby (GB); Edward Brook, Derby (GB)

(73) Assignee: Rolls-Royce PLC, London (GB)

( * ) Notice: Subject to any disclaimer, the term of this patent is extended or adjusted under 35 U.S.C. 154(b) by 1066 days.

(21) Appl. No.: 12/870,177

(22) Filed: Aug. 27, 2010

(65) Prior Publication Data

US 2011/0079015 A1    Apr. 7, 2011

(30) Foreign Application Priority Data

Oct. 5, 2009 (GB) .................. 0917319.6

(51) Int. Cl.
| | |
|---|---|
| *F02C 7/00* | (2006.01) |
| *F02G 3/00* | (2006.01) |
| *B01D 39/00* | (2006.01) |
| *F01D 17/16* | (2006.01) |
| *F01D 17/02* | (2006.01) |
| *F02C 9/22* | (2006.01) |
| *F02C 7/05* | (2006.01) |

(52) U.S. Cl.
CPC .......... *F01D 17/02* (2013.01); *F05D 2270/708* (2013.01); *F05D 2270/54* (2013.01); *F01D 17/16* (2013.01); *Y02T 50/671* (2013.01); *F02C 9/22* (2013.01); *F02C 7/05* (2013.01)
USPC .......... 60/779; 60/39.092; 60/39.093; 55/306

(58) Field of Classification Search
CPC .......... F01D 7/00; F01D 17/00; F01D 17/02; F02C 7/05; F02C 7/057; F02C 9/00; F02C 9/18; F02C 9/26; F02C 9/28; F02C 9/52; F02K 3/02; F05D 2270/02; F05D 2270/05; F05D 2270/096; F05D 2270/101; F05D 2270/708; F05D 2270/80; F05D 2270/81
USPC .................... 60/779, 39.092, 39.093; 55/306
See application file for complete search history.

(56) References Cited

U.S. PATENT DOCUMENTS

| | | | |
|---|---|---|---|
| 5,070,722 A | 12/1991 | Hawman et al. | |
| 5,528,224 A * | 6/1996 | Wang | 340/583 |
| 6,129,309 A * | 10/2000 | Smith et al. | 244/53 B |
| 6,659,712 B2 * | 12/2003 | Brooks et al. | 415/1 |

(Continued)

OTHER PUBLICATIONS

Search Report issued in Great Britain Patent Application No. 0917319.6 dated Feb. 3, 2010.

*Primary Examiner* — William H Rodriguez
*Assistant Examiner* — Arun Goyal
(74) *Attorney, Agent, or Firm* — Oliff PLC

(57) ABSTRACT

A gas turbine engine and an apparatus for operating the gas turbine engine includes at least one microphone to detect the sound of impacts of particles, a recorder to record the sound of the impacts, an analyzer to analyze the sound of the impacts of the particles, and a store of sounds of impacts, the stored sounds of impacts correspond to unfavorable weather conditions. A comparator compares the sound of the impacts of particles with one or more sounds of impacts stored in the store 68 sounds of impacts and if the comparator determines that the sound of the impacts of particles matches one or more stored sounds of impacts, a signal is sent to a control system for the gas turbine engine to adjust the operation of the gas turbine engine such that it operates in a safe mode of operation.

23 Claims, 1 Drawing Sheet

(56) References Cited

U.S. PATENT DOCUMENTS

| | | | |
|---|---|---|---|
| 7,591,183 B2* | 9/2009 | King | 73/660 |
| 8,000,847 B2* | 8/2011 | Shue | 701/10 |
| 8,170,730 B2* | 5/2012 | Shue | 701/10 |
| 2003/0056595 A1 | 3/2003 | Harrold et al. | |
| 2009/0072080 A1* | 3/2009 | Bhargava | 244/58 |
| 2010/0292905 A1* | 11/2010 | Agrawal et al. | 701/100 |

* cited by examiner

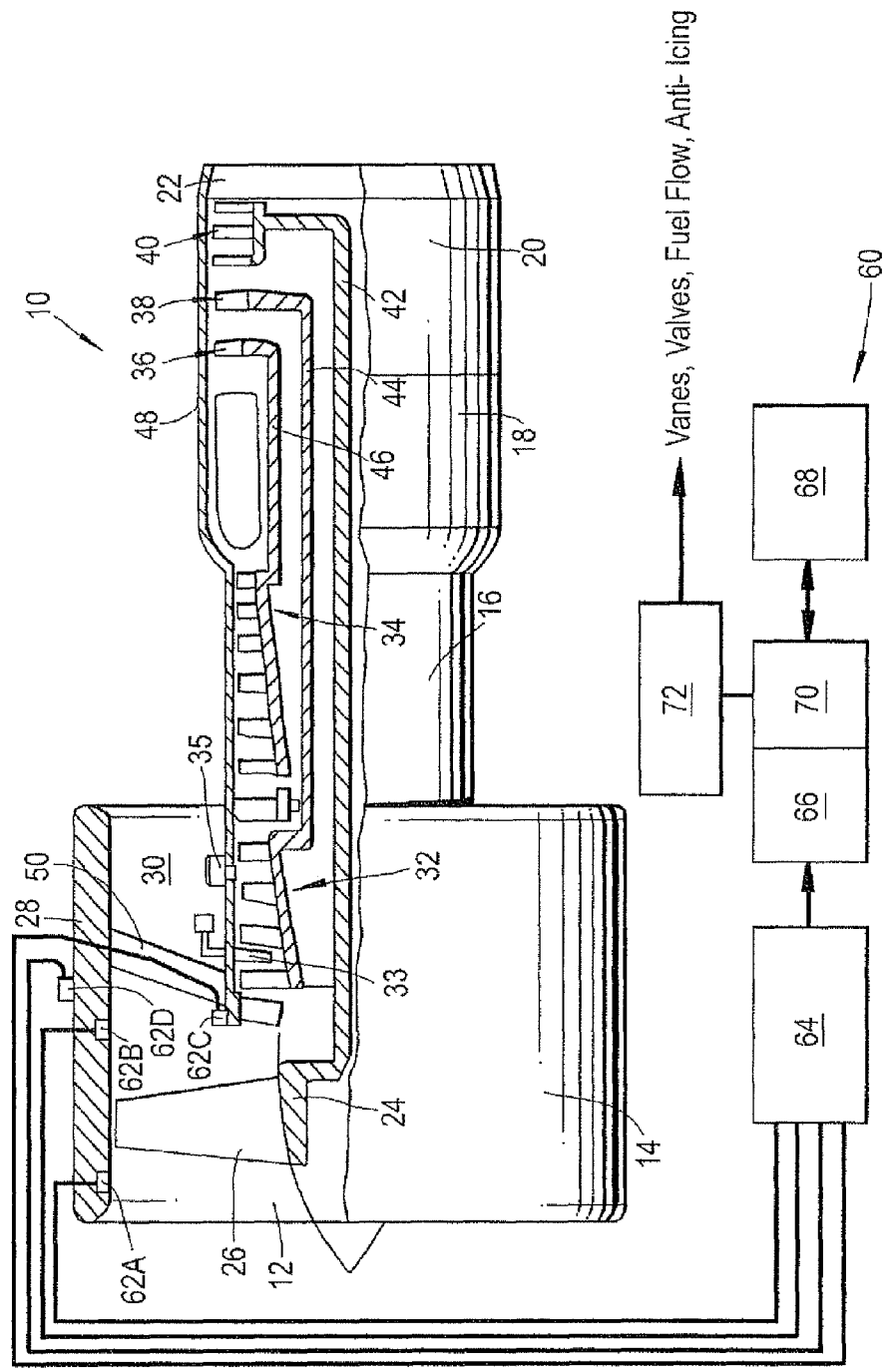

APPARATUS AND METHOD OF OPERATING A GAS TURBINE ENGINE

BACKGROUND

The present invention relates to an aircraft gas turbine engine.

In operation aircraft gas turbine engines encounter many different weather conditions. Heavy ingestion of rain, or hail, into a gas turbine engine during flight at low engine power settings may result in a compressor surge and an in-flight shut down. In order to avoid this problem the gas turbine engine is operated at a sufficiently high power level and/or is provided with sufficient compressor bleed to provide an adequate compressor surge margin.

Ingestion of water into a gas turbine engine during flight at high power settings may result in sudden cooling of the compressor blades while the compressor blades are driven at high rotational speeds. To counteract this problem thicker compressor blades have been used, which affects the aerodynamic efficiency of the compressor blades.

Ingestion of ice crystals into a gas turbine engine during flight at high altitudes may result in ice accretion on components of the gas turbine engine and shedding of ice into the core of the gas turbine engine. The ice shedding may cause damage to compressor blades and compressor vanes and/or may cause compressor surge and/or flame out in the combustor of the gas turbine engine. To counteract this problem the idle speed of the gas turbine engine is increased by the aircraft pilot and/or thicker compressor blades have been used in case the idle speed is not increased, which affects the aerodynamic efficiency of the compressor blades.

Therefore, the prior art manually adjusts the operation of the gas turbine engine away from optimum aerodynamic performance in order to protect the gas turbine engine from damage and/or changes the design of the components to increase the damage tolerance, increases the thickness, of the components, compressor blades, but moves away from optimum aerodynamic performance.

It is known to provide ice detectors on aircraft which indicate that the conditions are such that ice may form on cold aircraft components, e.g. wings, fuselage, pylon, and gas turbine engine components, e.g. intake, fan etc. The output signal of these sensors is used to initiate automatic aircraft anti-icing and/or engine anti-icing or activate a warning signal inside an aircraft cockpit such that the pilot initiates aircraft anti-icing and/or engine anti-icing. It is also known to use temperature sensors and altitude sensors to detect conditions which may form ice.

SUMMARY

There is no known device which detects inclement weather conditions, other than icing conditions, and which controls the operation of the gas turbine engine. This is a problem because other weather conditions may cause the gas turbine engine to malfunction or cause damage to the gas turbine engine.

Accordingly the present invention seeks to provide a novel gas turbine engine which reduces, preferably overcomes, the above mentioned problem.

Accordingly the present invention provides a method of operating a gas turbine engine comprising detecting impacts of particles on a surface of the gas turbine engine or a surface of an associated aircraft, recording the impacts, comparing the impacts of particles with one or more stored impacts, the one or more stored impacts correspond to unfavourable weather conditions, determining if the impacts of particles matches the one or more stored impacts and sending a signal to a control system for the gas turbine engine to adjust the operation of the gas turbine engine such that it operates in a safe mode of operation.

Preferably the method comprises detecting the sound of the impacts of particles on the surface of the gas turbine engine or the surface of the associated aircraft, recording the sound of the impacts, analysing the sound of the impacts in terms of frequency, amplitude and time, comparing the sound of the impacts of particles with the one or more stored sounds of impacts, the one or more stored sounds of impacts correspond to unfavourable weather conditions, determining if the sound of the impacts of particles matches the one or more stored sounds of impacts and sending a signal to a control system for the gas turbine engine to adjust the operation of the gas turbine engine such that it operates in a safe mode of operation.

The analysing may comprise digital signal analysis or analogue signal analysis.

The analysing may comprise performing a fast Fourier transformation.

The adjusting of the operation of the gas turbine engine may comprise adjusting one or more of the power of the gas turbine engine, the position of variable compressor vanes, the position of at least one compressor bleed valve, the speed of rotation of a shaft or providing anti-icing.

The particles may be detected by at least one microphone. The particles may be detected by an integrated detector, the integrated detector comprising a microphone and a surface, the surface of the integrated detector forming a surface of the gas turbine engine or a surface of the associated aircraft.

The particles may be rain drops, hail stones, ice particles, ice crystals or sand particles.

The method may comprise detecting impacts of particles on an outer surface of a nacelle, a surface of blade, a surface of a vane, a surface of an inlet, a surface of a wing and/or a surface of a fuselage. The vane may be a variable vane or a fixed vane. The blade may be a fan blade or a compressor blade.

The present invention also provides a gas turbine engine and an apparatus for operating the gas turbine engine comprising at least one detector to detect impacts of particles on a surface of the gas turbine engine or a surface of an associated aircraft, a recorder to record the impacts, a store of impacts, the one or more stored impacts correspond to unfavourable weather conditions, a comparator to compare the impacts of particles with the one or more impacts stored in the store of impacts, the comparator arranged to send a signal to a control system for the gas turbine engine to adjust the operation of the gas turbine engine such that it operates in a safe mode of operation if the comparator determines that the impacts of particles matches the one or more stored impacts Preferably the gas turbine engine comprises at least one detector to detect the sounds of the impacts of particles on the surface of the gas turbine engine or the surface of the associated aircraft, a recorder to record the sound of the impacts, an analyser to analyse the sound of the impacts of the particles in terms of frequency, amplitude and time, a store of sounds of impacts, the one or more stored sounds of impacts correspond to unfavourable weather conditions, a comparator to compare the sound of the impacts of particles with the one or more sounds of impacts stored in the store of sounds of impacts, the comparator arranged to send a signal to a control system for the gas turbine engine to adjust the operation of the gas turbine engine such that it operates in a safe mode of operation if the comparator determines that the sound of the impacts of particles matches the one or more stored sounds of impacts.

Preferably the analyser is a digital signal analyser or an analogue signal analyser.

The analyser may be arranged to perform a fast Fourier transformation.

The control system may be arranged to adjust the operation of the gas turbine engine by adjusting one or more of the power of the gas turbine engine, the position of variable compressor vanes, the position of at least one compressor bleed valve, the speed of rotation of a shaft or provide anti-icing.

The at least one detector may be a microphone. The at least one detector may be an integrated detector, the integrated detector comprising a microphone and a surface, the surface of the integrated detector being arranged to form a surface of the gas turbine engine or a surface of the associated aircraft. There may be a plurality of detectors.

The particles may be rain drops, hail stones, ice particles or ice crystals.

The at least one detector may be arranged to detect impacts of particles on an outer surface of a nacelle, a surface of blade, a surface of a vane, a surface of an inlet, a surface of a wing and/or a surface of a fuselage. The vane may be a variable vane or a fixed vane. The blade may be a fan blade or a compressor blade.

The gas turbine engine maybe a turbofan, a turbojet or a turbo-propeller.

BRIEF DESCRIPTION OF THE DRAWINGS

The present invention will be more fully described by way of example with reference to the accompanying drawings in which:—

FIG. 1 shows a turbofan gas turbine engine having an apparatus for operating a gas turbine engine according to the present invention.

DETAILED DESCRIPTION

A turbofan gas turbine engine 10, as shown in FIG. 1, comprises in axial flow series an inlet 12, a fan section 14, a compressor section 16, a combustion section 18, a turbine section 20 and an exhaust 22. The fan section 14 comprises a fan rotor 24, which carries a plurality of circumferentially spaced radially outwardly extending fan blades 26. The fan rotor 24 and the fan blades 26 are surrounded by a fan casing 28 to define the outer extremity of a fan duct 30. The compressor section 16 comprises an intermediate pressure compressor 32 and a high pressure compressor 34. The intermediate pressure compressor 32 has variable compressor vanes 33 and at least one, preferably a plurality of compressor bleed valves 35. The turbine section 20 section comprises a high pressure turbine 36, an intermediate pressure turbine 38 and a low pressure turbine 40. The low pressure turbine 40 is arranged to drive the fan rotor 24 and fan blades 26 via a shaft 42, the intermediate pressure turbine 38 is arranged to drive the intermediate pressure compressor 32 via a shaft 44 and the high pressure turbine 36 is arranged to drive the high pressure compressor 34 via a shaft 46. The compressor section 16, the combustion section 18 and the turbine section 20 are enclosed in a core engine casing 48. A plurality of circumferentially spaced and radially extending fan outlet guide vanes 50 extend between and are secured to the fan casing 28 and the core engine casing 48. The turbofan gas turbine engine 10 operates quite conventionally.

The turbofan gas turbine engine 10 also comprises an apparatus 60 for operating the turbofan gas turbine engine 10. The apparatus 60 comprises at least one detector 62 to detect impacts of particles on a surface of the gas turbine engine 10, a recorder 64 is arranged to record the sound of the impacts and an analyser 66 is arranged to analyse the sound of the impacts of the particles in terms of frequency, amplitude and time. The apparatus 60 also comprises a store 68 of sounds of impacts, the one or more stored sounds of impacts correspond to unfavourable weather conditions. A comparator 70 is arranged to compare the sound of the impacts of particles with one or more sounds of impacts stored in the store 68 of sounds of impacts. If the comparator 70 determines that the sound of the impacts of particles matches one or more stored sounds of impacts in the store 68 of sound of impacts the comparator 70 is arranged to send a signal to a control system 72 for the turbofan gas turbine engine 10 to adjust the operation of the turbofan gas turbine engine 10 such that it operates in a safe mode of operation. The analyser 66 is arranged to perform a fast Fourier transformation on the sound of the impacts.

The control system 72 is arranged to adjust the operation of the turbofan gas turbine engine 10 by adjusting one or more of the power of the turbofan gas turbine engine 10, the position of the variable compressor vanes 33, the position of the at least one compressor bleed valve 35, the speed of rotation of one or more of the shafts 42 and/or 44 and/or 46 or providing anti-icing.

As shown in FIG. 1 the apparatus comprises a plurality of detectors 62, at least one of the detectors 62A is arranged on the fan casing 28 upstream of the fan rotor 24 and fan blades 26 in the inlet 12 of the fan duct 30, at least one of the detectors 62B is arranged on the fan casing 28 downstream of the fan rotor 24 and fan blades 26 in the fan duct 30, at least one of the detectors 62C is arranged on the core engine casing 48 at the upstream end of the core engine casing 48 and at least one detector 62D is arranged on an outer surface of the nacelle/fan casing 28. The at least one detector 62A, 62B, 62C and 62D is arranged to detect impacts of particles on an outer surface of the nacelle/fan casing 28, a surface of blade 26, a surface of a vane 50, a surface of an inlet 12/a surface of a fan casing 28 in the fan duct 30. The vane may be a variable vane or a fixed vane 50. The vane may be a fan outlet guide vane 50 or a compressor vane. The blade may be a fan blade 26 or a compressor blade. The at least one detector 62 may be a microphone. The at least one detector is arranged to detect the impact of particles of for example rain drops, hail stones, ice particles, ice crystals, sand particles or volcanic ash particles on the surfaces of the turbofan gas turbine engine 10. The at least one detector 62 may also detect impacts of other foreign objects, such as debris and or birds.

The present invention is based on the fact that a particle produces a sound when it impacts on a surface of an object. Thus particles of rain, hail, ice, volcanic ash etc or sand etc flowing into the inlet of a turbofan gas turbine engine 10 impact on the surfaces of the turbofan gas turbine engine and produce a sound, or noise. The impacts of different particles, e.g. particles of different shape, different size, different mass, different physical state produce different sounds, or noises. Thus, the impacts of different particles results in different specific sound, or noise, signatures and these different sound, or noise, signatures may be used to determine what type of particle has impacted on a surface of the turbofan gas turbine engine. Knowing the type of particle entering the turbofan gas turbine engine it is possible to adjust the operation of the turbofan gas turbine engine to take into account the presence of these particles in the air entering the inlet of the turbofan gas turbine engine.

The sounds, or noise, of the impacts produced by the particles is detected, recorded, analysed and compared with known impacts to determine the type of particle and then the operation of the turbofan gas turbine engine may be adjusted to ensure it is operating in a safe mode of operation. The detector must be capable of detecting the amplitude and frequency of the sound signal from the impact and the detector may be a microphone or other suitable transducer.

The electric signal from the detector 62 is continuously recorded and transferred to an analyser 66, a signal processing unit, where a Fourier transformation, e.g. a fast Fourier transformation, is accomplished to generate a three dimensional, e.g. frequency, amplitude and time, plot of the particular sound of an impact, and the particular particle and hence the weather conditions. The comparator 70 compares the plot of the particular sound of an impact, with previously detected sounds of impacts and with a list of known sounds of impacts in the store 68 of sounds of impacts. Each sound of an impact in the store 68 of sounds of impacts comprises a frequency, amplitude and time, plot. The store 68 of sounds of impacts is a database of inclement weather conditions or unfavourable weather conditions. The store 68 of sounds of impacts may be updated by determining that a particular sound of an impact is similar to a sound of an impact in the store 68 of sounds of impacts and thus is indicative of an inclement weather condition and thus is added to the store 68 of sounds of impacts. If the comparator 70 determines that the particular sound of an impact matches, or is sufficiently similar to a sound of an impact in the store 68 of sounds of impacts, it sends a signal to the control system 72 to move the turbofan gas turbine engine 10 from a critical operating condition to a safe operating condition. The control system 72 may then produce changes in the engine power, the position of variable compressor vanes, the position of at least one compressor bleed valve, the shaft speed, a pneumatic anti-icing, an electric anti-icing or other control parameter which puts the turbofan gas turbine engine in a safe operating condition. The engine power is changed by adjusting the fuel flow. The control system 72 may send a warning signal to the aircraft cockpit, transfer data or information between the engine system and the aircraft system or between the engine system and a ground system for analysis or between the aircraft system and a ground system for analysis. The control system 72 also takes into account the actual operating condition of the turbofan gas turbine engine 10 at that particular moment for example the power setting of the turbofan gas turbine engine 10, the positions of variable compressor vanes and the positions the at least one of compressor bleed valve etc.

If the turbofan gas turbine engine 10 is operating at low engine power settings during flight and the presence of heavy rain or hail is detected by the detector 62 and comparator 70, the comparator 70 sends a signal to the control system 72 to increase the power setting, fuel flow, of the turbofan gas turbine engine 10 and/or opens the compressor bleed valve or compressor bleed valves, 35 to provide sufficient surge margin for the compressor.

If the turbofan gas turbine engine 10 is operating at high altitudes at idle power setting during flight and the presence of ice crystals is detected by the detector 62 and comparator 70, the comparator 70 sends a signal to the control system 72 to increase the idle power setting, idle fuel flow, of the turbofan gas turbine engine 10 and/or opens the compressor bleed valve, or compressor bleed valves, 35 to provide sufficient surge margin for the compressor, to prevent combustor flame out and to prevent damage to the compressor rotor blades.

The advantage of the present invention is that it detects all inclement, or adverse, weather conditions that may cause a threat to the turbofan gas turbine engine and/or aircraft. The present invention is able to distinguish, or differentiate, between different types of inclement weather and then to change the operation of the turbofan gas turbine engine to mitigate the effects of the inclement weather conditions. The present invention allows the compressor rotor blades to be made more aerodynamic and thinner, this would improve aerodynamic efficiency, increase surge margin, reduce weight and reduce specific fuel consumption. The present invention would allow the idle speed of the turbofan gas turbine engine to be reduced, but allow for a temporary increase of idle speed in the event that rain or hail is encountered and this would reduce specific fuel consumption.

Although the present invention has been described with reference to a turbofan gas turbine engine it is equally applicable to a turbojet gas turbine engine, a turbo-propeller gas turbine engine or a turbo-shaft gas turbine engine.

Although the present invention has been described with reference to the use of a detector, e.g. a microphone, to detect the sound, a change in the pressure in the air, caused by the impacts of the particles it is equally possible to use a detector to detect the actual impact, the change in pressure caused by direct impact of the particles. An actual impact detector may be heated to prevent ice accretion thereon.

Although the present invention has been described with reference to the use of a detector, e.g. a microphone, to detect the sound of an impact on a surface of the gas turbine engine, or in particular to detect an impact on a surface of a component, e.g. fan casing, core casing, blade, vane of the gas turbine engine, it may be equally possible to provide an integrated detector which has a detector, e.g. a microphone, and a surface upon which particles may impact. The integrated detector is positioned so that the surface of the integrated detector forms a surface of a component of the gas turbine engine or a surface of the gas turbine engine.

Although the present invention has been described with reference to the use of a digital signal analysis, e.g. fast Fourier transformation, or a Fourier transformation, it is equally possible to use analogue signal analysis. Although the present invention has described the impact detectors on the gas turbine engine it may be possible to provide one or more of the impact detectors on the associated aircraft, e.g. the aircraft wing or the aircraft fuselage.

The present invention thus detects impacts of particles on a surface of the gas turbine engine, or a surface of an associated aircraft, records the impacts, analyses the impacts to determine the characteristics of the impacts, compares the impacts of the particles with one or more stored impacts of unfavourable weather conditions, determines if the impacts of the particles matches the one or more stored impacts and sends a signal to a control system for the gas turbine engine to adjust the operation of the gas turbine engine such that it operates in a safe mode of operation.

The detector may detect audible sounds, ultrasonic sounds and/or acoustic emissions.

The present invention may be used with other conventional ice detectors and rain or hail detectors.

The invention claimed is:

1. A method of operating a gas turbine engine, the gas turbine engine having a combustor, a control system, variable compressor vanes, at least one compressor bleed valve, a shaft and an anti-icing device, the method comprising:
    detecting impacts of particles on a surface of the gas turbine engine or a surface of an associated aircraft;
    recording the impacts;
    comparing the impacts of the particles with one or more stored impacts; wherein the one or more stored impacts correspond to unfavorable weather conditions; and
the one or more stored impacts correspond to one or more impacts of rain drops, hail stones, ice particles or ice crystals;
determining if the impacts of the particles matches the one or more stored impacts; and
sending a signal to the control system for the gas turbine engine to adjust at least one of a position of the variable compressor vanes, a position of the at least one compressor bleed valve, a speed of rotation of the shaft, or to provide anti-icing, in order to provide sufficient surge margin for a compressor, to prevent combustor flame out, to prevent damage to compressor rotor blades, or to prevent damage to compressor stator vanes, respectively, such that the gas turbine engine operates in a safe mode of operation when it is determined that the impacts of the particles matches the one or more stored impacts.

2. The method as claimed in claim 1, the method further comprising:
detecting the impacts of the particles by detecting a sound of the impacts of particles on the surface of the gas turbine engine or the surface of the associated aircraft;
recording the sound of the impacts of the particles;
analysing the sound of the impacts of the particles in terms of frequency, amplitude and time;
comparing the sound of the impacts of the particles with the one or more stored sounds of impacts,
determining if the sound of the impacts of the particles matches the one or more stored sounds of impacts.

3. The method as claimed in claim 2, wherein the analysing comprises digital signal analysis or analogue signal analysis.

4. The method as claimed in claim 3, wherein the analysing comprises performing a fast Fourier transformation.

5. The method as claimed in claim 2, further comprising detecting the particles with at least one microphone.

6. The method as claimed in claim 1, further comprising detecting impacts of particles on a surface selected from the group comprising an outer surface of a nacelle, a surface of blade, a surface of a vane, a surface of an inlet, a surface of a wing and a surface of a fuselage.

7. The method as claimed in claim 6, further comprising detecting impacts of particles on a variable vane or a fixed vane.

8. The method as claimed in claim 6, further comprising detecting impacts of particles on a fan blade or a compressor blade.

9. The method as claimed in claim 1, further comprising detecting a change in pressure caused by direct impacts of the particles.

10. The method as claimed in claim 1, further comprising detecting a change in pressure in the air caused by the impacts of the particles.

11. The method as claimed in claim 1, wherein the gas turbine engine is operating at low power settings during flight, the method further comprising sending a signal to the control system to increase the power setting and/or open the at least one compressor bleed valve to provide sufficient surge margin for the compressor if heavy rain or hail is detected.

12. The method as claimed in claim 1, wherein the gas turbine engine is operating at idle power settings during flight, the method further comprising sending a signal to the control system to increase the idle power setting and/or open the at least one compressor bleed valve to provide sufficient surge margin for the compressor.

13. A gas turbine engine and an apparatus for operating the gas turbine engine, the gas turbine engine having a combustor, a control system, variable compressor vanes, at least one compressor bleed valve a shaft and an anti-icing device, the apparatus comprising:
at least one detector to detect impacts of particles on a surface of the gas turbine engine or a surface of an associated aircraft;
a recorder to record the impacts;
a store of one or more stored impacts; wherein
the one or more stored impacts correspond to unfavorable weather conditions; and
the one or more stored impacts correspond to one or more impacts of rain drops, hail stones, ice particles or ice crystals;
a comparator to compare the impacts of particles with the one or more impacts stored in the store of impacts, the comparator being arranged to send a signal to a control system for the gas turbine engine to adjust at least one of a position of the variable compressor vanes, a position of the at least one compressor bleed valve, a speed of rotation of the shaft, or to provide anti-icing, in order to provide sufficient surge margin for a compressor, to prevent combustor flame out, to prevent damage to compressor rotor blades, or to prevent damage to compressor stator vanes, respectively, such that the gas turbine engine operates in a safe mode of operation when it is determined that the impacts of the particles matches the one or more stored impacts.

14. The gas turbine engine as claimed in claim 13, wherein
the at least one detector detects a sound of the impacts of the particles on the surface of the gas turbine engine or the surface of the associated aircraft;
the recorder records the sound of the impacts of the particles;
the analyser analyses the sound of the impacts of the particles in terms of frequency, amplitude and time;
the store of impacts stores the sound of the impacts, the one or more stored sounds of impacts corresponding one or more impacts of rain drops, hail stones, ice particles or ice crystals;
the comparator compares the sound of the impacts of the particles with the one or more sounds of impacts stored in the store of sounds of impacts.

15. The gas turbine engine as claimed in claim 14, wherein the analyser is a digital signal analyser or an analogue signal analyser.

16. The gas turbine engine as claimed in claim 15, wherein the analyser is arranged to perform a fast Fourier transformation.

17. The gas turbine engine as claimed in claim 14, wherein the at least one detector is a microphone.

18. The gas turbine engine as claimed in claim 13, wherein the at least one detector is arranged to detect impacts of particles on a surface selected from the group comprising an outer surface of a nacelle, a surface of blade, a surface of a vane, a surface of an inlet, a surface of a wing and a surface of a fuselage.

19. The gas turbine engine as claimed in claim 18, wherein the vane is selected from the group comprising a variable vane and a fixed vane.

20. The gas turbine engine as claimed in claim 18, wherein the blade is selected from the group comprising a fan blade and a compressor blade.

21. The gas turbine engine as claimed in claim 13, wherein the gas turbine engine is selected from the group comprising a turbofan, a turbojet and a turbo-propeller.

22. The gas turbine engine as claimed in claim 13, wherein the at least one detector is arranged to detect a change in pressure caused by direct impact of the particles.

23. The gas turbine engine as claimed in claim 13, wherein the at least one detector is arranged to detect a change in pressure in the air caused by the impacts of the particles.

* * * * *